United States Patent [19]
McAllister et al.

[11] Patent Number: 4,595,714
[45] Date of Patent: Jun. 17, 1986

[54] ABLATIVE COATING COMPOSITION AND PRODUCT

[75] Inventors: Lawrence E. McAllister, Dayton; Herbert Dietrich, Kennybunk; John E. Hill, Jr., Biddeford, all of Me.

[73] Assignee: Fiber Materials, Inc., Biddeford, Me.

[21] Appl. No.: 243,608

[22] Filed: Mar. 13, 1981

[51] Int. Cl.$^4$ ................................................ C08K 3/18
[52] U.S. Cl. .................................... 523/179; 523/435; 523/445
[58] Field of Search .................... 260/37 EP; 523/179, 523/435, 445

[56] References Cited

U.S. PATENT DOCUMENTS 3,600,341  8/1971  Schmidt et al. ................ 260/37 EP
3,723,481  3/1973  Bobear ................................ 523/179
3,875,106  4/1975  Lazzaro ........................... 260/37 EP
4,001,126  1/1977  Marion et al. ................... 260/37 EP
4,289,680  9/1981  Kimura ............................ 260/37 EP Primary Examiner—Lewis T. Jacobs
Attorney, Agent, or Firm—Schiller & Pandiscio

[57] ABSTRACT

A coating composition for application to a substrate for curing thereon to form an ablative coating. The composition comprises a reactive mixture of epoxy and polysulfide resins, an amine curing agent, refractory fibers and inorganic materials serving as a source of one or more Lewis acids and being capable of forming a glassy reaction product when exposed to heat. When applied to a substrate, the solvent-free composition cures to a tightly adhering, flexible coating capable of providing thermal protection in a very high-temperature, erosive environment.

22 Claims, No Drawings

ABLATIVE COATING COMPOSITION AND PRODUCT

This invention relates to coatings based on polymeric resins and more particularly to an ablative self-curing polymeric coating composition and product and the method of making same.

Distinction should be made among flame resistant, flame retardant and ablative materials. Flame resistant materials can be defined as those which will not burn on contact with a flame, or if ignited will not propagate fire. For example, ceramic and cementitious materials, structural metals and the like are considered to be flame resistant.

Flame retardant material, on the other hand, can be defined as that which when exposed to a flame, will ignite but will propagate the fire reluctantly or very slowly. The examples are a number of synthetic polymers such as those described for example in U.S. Pat. Nos. 3,783,133, 3,514,424, 3,748,317, 3,524,901 and many others.

Ablative materials are flame retardant in the sense that, when exposed to heat they burn, if at all very slowly, but albative materials exhibit properties beyond mere flame retardancy. When ablative material is exposed not only to heat but to the erosive effects of a blast or stream of hot gas or plasma, energy is locally absorbed from the hot gas by melting or vaporization occurring at the surface of the ablative material. The melted or vaporized material tends to form a fluid boundary layer which prevents the hot gas flow from directly impinging on the ablative material, decreases the value of the gas-film coefficient and reduces the gas temperature near the material. Of course, all of the foregoing depends on the nature of the flame or hot gas, particularly its chemistry and most importantly its temperature. For example, materials such as zirconia which is considered a flame proof material at the relatively modest heat of a match flame, is used as an ablative liner in rocket 2nozzles in which the temperatures can be several thousand degrees. The materials of interest in the present invention are materials which are considered fire retardant and ablative to flame at temperatures of at least 2000° F. and above.

Ablative coating materials are used to protect various substrates from flame damage. Exemplary of such substrates are the firewalls in aircraft, ships and many buildings; the airframes of aircraft from which rockets are fired; the docks and superstructures of naval vessels; and landbased rocket launchers. Ablative coatings for such substrates must exhibit good adhesion, flexibility and environmental stability in addition to providing the necessary flame protection.

A number of different types of commercially available ablative coating materials are primarily based on silicone rubbers, epoxy resins, polyurethane resins or fluorocarbon elastomers. The silicones are relatively expensive and do not exhibit a satisfactory combination of ablative and erosion prevention performance; and the epoxies are generally too rigid to provide good thermal strain compatibility with most substrates. Polyurethanes, in addition to exhibiting poor thermal stability, form toxic degradation products. Finally, the fluorocarbons are expensive and must be applied from solutions having low solids content, a fact which makes it necessary to remove large amounts of volatile solvents and limits the coating thickness which can be achieved in any one application. There is, therefore, a real need for an improved ablative coating capable of protecting various substrates in an ablative environment.

It is therefore a primary object of this invention to provide an improved ablative coating composition which can be applied to various substrates to protect the substrates from flame. It is another object to provide a coating composition of the character described which is relatively inexpensive, has a long shelf-life of components prior to final mixing, and is easily and rapidly applied. Still a further object is to provide an ablative coating composition which is flexible enough to provide good thermal strain compatibility, exhibits good thermal stability, achieves a tight bond with a wide range of surfaces, requires no solvent removal and is self-curing. Other objects of the invention will in part be obvious and will in part be apparent hereinafter.

The invention accordingly comprises the several steps and the relation of one or more of such steps with respect to each of the others, the composition possessing the features, properties, and the constituents, and the article which possesses the characteristics, properties and relation of elements, all as exemplified in the detailed disclosure hereinafter set forth, and the scope of the invention will be indicated in the claims.

According to one aspect of this invention there is provided a coating composition suitable for application to a substrate for curing thereon to form an ablative coating. The composition comprises a reactive mixture of an epoxy resin and a polysulfide resin in which the epoxy resin makes up at least 25% by weight of the total resin content. The mixture is self-curing and provides a tough, adherent coating which will form a char when exposed to a high temperature flame. The composition also contains an amine curing agent for the reactive resin mixture, a mixture of finely divided inorganic materials providing a source of one or more Lewis acids and being capable of forming a glassy reaction product to stabilize the char, and short or chopped refractory fibers of with a reasonable aspect ratio, i.e. at least 7:1 or greater, which retain their fibrous structure during formation of the char. The composition may also optionally contain a flattening agent and one or more low density fillers.

According to another aspect of this invention long shelf life of the composition is achieved by providing the coating composition as a system of two components which are mixed just prior to application onto the substrate. The resin system comprises Components A and B which when mixed provide a coating composition suitable for application to a substrate for curing thereon to form an ablative coating. Component A comprises a liquid polysulfide resin, an amine curing agent, and short refractory fibers. Component B comprises a liquid epoxy resin, a mixture of finely divided inorganic materials providing a source of one or more Lewis acids and being capable of forming a glassy reaction product when the coating is exposed to an ablative/erosion environment, and short refractory fibers. The compositions of Components A and B are so adjusted that when mixed to form the coating composition the epoxy resin makes up at least 25% by weight of the total resin content; the amine curing agent is present in an amount between about 5% and 15% and inorganic materials amount to between about 20% and about 25% by weight of the total resin content; and the fibers amount to between about 25% and 40% by weight of the total resin content, with the major portion of the fibers being Component A. Blending of these two liquid components, each being relatively inactive per se or inert, gives rise to the coating composition of this invention as they react with one another.

According to a further aspect of this invention there is provided a substrate having adhered to the surface thereof an ablative coating characterized as being the polymeric reaction product of a polysulfide resin and an epoxy resin and having distributed therethrough a mixture of finely divided inorganic materials providing a source of one or more Lewis acids and being capable of forming a glassy product when the coating is exposed to a temperature in excess of about 2000° F.; and refractory fibers.

The inorganic materials and the fibers are present in amounts equivalent to between 20% and about 25% and about 40% by weight of the reaction product, respectively.

According yet another aspect of this invention there is provided a method of protecting a substrate in an ablative/erosion environment, comprising the steps of applying to the surface of a substrate a coating composition comprising a reactive resin mixture of an epoxy resin and a polysulfide resin in which the epoxy resin makes up at least 25% by weight of the total resin content, an amine curing agent for the reactive mixture, a mixture of finely divided inorganic materials providing a source of one or more Lewis acids and being capable of forming a glassy reaction product when exposed to the ablative/erosion environment, and short refractory fibers; and curing the reactive resin mixture under ambient conditions.

Component A

The inert composition making up Component A comprises the polysulfide resin, the curing agent for the resin mixture and a portion of the short fibers.

The liquid polysulfide resins suitable for this component may be characterized as long chain aliphatic polymers containing disulfide linkages and being mercaptan-terminated. These resins are commercially available, and one sold by Thiokol Corp. under the tradename LP-3 may be taken as exemplary. This LP-3 polysulfide resin is further identified as having a viscosity of 9.4 to 14.4 poises at 25° C., a mercaptan content of 5.9 to 7.7%, an average molecular weight of 1,565, a pour point of −26° C. and a specific gravity of 1.27 at 25° C.

The role of the polysulfide resin is to impart flexibility and toughness to the cured ablative coating thereby making it possible to apply coatings of effective thickness to existing substrate surfaces of essentially any configuration and to provide good thermal strain compatability to the coating as it provides protection to the substrate in an ablative/erosion environment.

The amount of polysulfide resin in relation to the amount of epoxy resin used depends upon the degrees of flexibility and toughness desired in the applied coating. The quantity of the polysulfide resin in Component A can be defined as not greater than 75% by weight of the total weight of the reactive resin mixture, i.e., weight of polysulfide resin plus weight of epoxy resin. However, it is desirable to use less than 75% by weight and preferable to use between 40 and 60% of the polysulfide liquid resin by total resin weight.

It is necessary to add the curing agent to Component A since it is reactive with the epoxy resin of Component B. Such curing agents are well known, and among those most commonly used are the primary and tertiary amines. Exemplary of the former is triethylene tetramine which is commercially available as a curing agent. Such a primary aliphatic amine is known to catalyze cross-linking and homopolymerization of the epoxy resin and also to promote the reaction between the mercaptan groups of the polysulfide resin and the epoxide groups of the epoxy resin. Inasmuch as the separate composition components must remain stable over extended periods of time, the amine curing agent should be compatible with the polysulfide resin used.

The amount of the amine curing agent incorporated in Component A is based upon the total weight of the reactive resins, and it may vary between about 5% and 15% of that total weight. A complete rapid cure of the resin system may not occur with less than about 5% curing agent and the use of more than 15% gives rise to excessive exothermicity.

The short refractory fibers apparently serve to reinforce and stabilize the coating under high heat flux and erosion environments. Together with the glass-forming inorganic particulate material, they appear to strengthen and toughen the chaf as it is formed from the resins as the latter are subjected to high heat flame. The fibers also contribute to the ready smooth application of the mixed coating composition to the substrate.

The fibers may be of any material which retains its fibrous structure and does not soften at the temperature reached by the coating during exposure to the high heat flux. Thus, for example, they may be silica, carbon (graphite) or ceramic (e.g., alumina, zirconia, silicon carbide, etc.). Exemplary of suitable carbon fibers are those having diameters of 9 to 10 m, lengths of about 100 m (aspect ratio of about 10) and a bulk density of about 600 gms/liter. Silica and ceramic fibers of similar dimensions are suitable, and in those cases in which the ablative coating can not be electrically conductive, they must be used rather than carbon fibers. Generally, fibers having aspect ratios of at least 7 are preferable.

In formulating Component A, the curing agent and fibers are preferably separately blended into the liquid polysulfide resin using any suitable mixing equipment. The resulting mixture is stable and can be stored for prolonged periods of time.

Component B

The composition making up Component B comprises the liquid epoxy resin, preferably the glass-forming inorganic particulate material and the remaining fibers. Minor amounts of a flattening agent and of a low-density filler may also be added.

The epoxy resins used are glycidyl ether derivatives of polynuclear phenols. The diglycidyl ethers of bisphenol A are commercially available and particularly suitable for the coating composition of this invention. However, glycidyl ethers of any polynuclear aromatic phenol, including such phenols as resorcinol or novalac phenolic resins may be used. It is believed that the aromatic structure of these epoxy resins contributes to the thermal stability and char yield of the ablative coatings.

Exemplary of an epoxy resin for Component B is the diglycidyl ether of bisphenol A (2,2-bis-(p-(2,3-epoxy propoxy) phenyl) propane) sold as Epon 828 by Shell Chemical Co. This epoxy resin has an epoxy equivalent weight of 185 to 192, a viscosity of 10,000 to 16,000 centipoises at 25° C., a molecular weight of 380 and specific gravity of 1.165. This resin can be diluted with a small amount, e.g., about 10% by weight of butyl glycidyl ether.

In order to keep both Component A and B pourable for mixing, it is desirable to divide the total fibers between these components. It will generally be preferable to add somewhat more than half of the fibers (e.g. up to 65% by weight) to Component A due to the lesser viscosity of the liquid polysulfide resin. Based on the total weight of the reactive resins, it is preferable that the fiber content by weight in the composition formed after mixing Components A and B, should be between about 25% to about 40%. A minor portion of the fibers, e.g., up to about 15 to 20% may be replaced by low-density fillers such as phenolic, glass or carbon microballoons, ground cork, pearlite and the like to reduce the density and/or thermal conductivity of the coatings.

As noted above, the relative amounts of epoxy and polysulfide resins depend upon such physical characteristics as toughness and flexibility, balanced against char yield, all as desired in the ablative coating. In keeping with the limit on the amount of polysulfide resin which may be present in Component A, it follows that the weight of epoxy resin incorporated in Component B must be at least 25% by total resin weight, a preferable range being between 40% and 60% of the total resin weight.

To serve as an effective ablative coating it appears necessary to be able to form a stable char, i.e. one which provides an essentially continuous barrier to intense flame heat and which remains adhered to the substrate it is protecting. It seems reasonable to postulate that the formation and maintenance of a stable char accomplishes several functions. Among these are the reduction of mass loss and of the amount of flammable gas released due to pyrolysis, and the lowering of the recession/ erosion rate. Although the exact mechanism of char induction is not well understood, it is believed to be catalyzed by the presence of one or more Lewis acids (electron pair acceptors) or precursors of Lewis acids. The Lewis acids are commonly used in formulating fire retardant materials which as noted earlier, should be distinguished from the ablative coatings of this invention. Ablative performance involving rapid char induction and lasting char stability is attained in the coating of this invention through the use of fibers in conjunction with a mixture of glass-forming inorganics which also meet the requirement of providing a Lewis acid. Whatever their precise role may be, these glass-forming materials produce the desired stabilization of the char. The effect of the presence of such inorganic materials is clearly indicated in the summary of test data given below for the coatings of Examples 1-6. A preferred mixture of inorganic, glass-forming particulate material comprises equal weights of zinc borate and alumina trihydrate. The materials are preferably sized between about 20 $\mu$m and 60 $\mu$m. In combination they are added to Component B in an amount from about 20% to about 25% by total resin weight.

That portion of the total fiber content not added to Component A is added to Component B along with any low-density fillers required and any flattening agent which may be considered desirable. The purpose of the flattening agent is to give the final cured coating formed on the substrate a dull, or matte finish. Amorphous silica in minor amounts, e.g., from about 1% to about 2% by total resin weight, is an effective flattening agent.

In formulating Component B, the inorganic particulate materials, the flattening agent, and then the fibers are added separately with intermediate stirring to the liquid epoxy resin.

To prepare the ablative coating composition, Components A and B are mixed in proportions to provide the desired ratio of the two resins. Inasmuch as the system becomes chemically active with such mixing, the coating composition should be applied to the substrate (by brushing, trowelling or other suitable techniques) promptly after mixing is completed. The curing reaction is exothermic and the self-curing will be complete in one to several days, depending upon the thickness of the coat applied, as well as on the temperature and humidity of the surroundings.

Inasmuch as the coating composition is made without solvents, it is possible to apply coatings over a wide range of thicknesses; and to cover substrates in place irrespective of their size, contour or location. The coating composition adheres well to essentially any clean surface, and presents in its cured state a pleasant matte-like surface.

The following examples, which are meant to be illustrative and not limiting, are given to further describe this invention and to detail the performance characteristics of the coating under several different test conditions.

In the following examples all parts are by weight and the full volumes of Components A and B are mixed to form the coating composition.

EXAMPLE 1

Component A

A resin mixer was charged with 100 parts of a liquid polysulfide polymer (sold by Thiokol Corp. as LP-3); and 10 parts of triethylene tetramine was thoroughly blended through the resin. Then 30 parts of high-strength, high-modulus carbon fibers derived from a pitch precursor (9 m in diameter and about 100 m long, sold by Union Carbide Corporation under the tradename of VME) was thoroughly blended into the resin mass.

Component B

A second resin mixer was charged with 100 parts of a liquid epoxy resin (sold by Shell Chemical Co. as Epon 828 and identified as a diglycidyl ether of bisphenol A), and to it were added in sequence with intermediate stirring 25 parts zinc borate, 25 parts alumina trihydrate, 4 parts ultra high surface area amorphous silica and 30 parts of the same carbon fibers used in Component A.

EXAMPLE 2

Component B was formulated as in Example 1 except that the zinc borate and alumina trihydrate were omitted.

EXAMPLES 3 and 4

Component B was formulated as in Example 1 except that the aluminum trihydrate was omitted in Example 3 and was replaced in Example 4 by an additional 25 parts of zinc borate making a total of 50 parts of that constituent.

EXAMPLES 5 and 6

Component B was formulated as in Example 1 except that the zinc borate was omitted in Example 5 and was replaced in Example 6 by an additional 25 parts of aluminum trihydrate making a total of 50 parts of that constituent.

In each example all of Components A and B were mixed together and the resulting compositions were cast as 0.250 inch (0.635 cm) thick coatings on stainless steel and 0.125 inch (0.318 cm) 6016 aluminum substrates. The coatings were allowed to achieve full cure over several days at ambient temperature and humidity. The coated substrates were then placed in a vertical mount and subected to an oxyacetylene torch flame at an impingement angle of 45°, utilizing a flame-to-sample distance designed to produce a temperature of 5100° F. (2801° C.). The test involved a seven-second application of the flame followed immediately by an eight-second 50-psi cutting mode.

The effectiveness of these cured compositions as ablative coatings in the erosive environment of the test used was determined by measuring the total volume of coating removed and observing the erosion profile of the cross-sectioned substrate. The results in terms of volumes removed are given in Table I.

TABLE I
Effectiveness of Ablative Coatings

| Ex. No. | Parts by Wt in Comp. B | | Volume of Coating Removed (cc) |
|---|---|---|---|
| | Zinc Borate | Alumina Trihydrate | |
| 1 | 25 | 25 | 0.96 |
| 2 | — | — | 3.07 |
| 3 | 25 | — | 1.02 |
| 4 | 50 | — | 1.54 |
| 5 | — | 25 | 1.79 |
| 6 | — | 50 | 4.09 |

From the results given in Table I, it is apparent that the addition of zinc borate contributes to the ablation properties of the coating and that the addition of both zinc borate and alumina trihydrate produces an unexpected synergistic effect. In another evaluation test of the ablative properties of the coating of this invention, test specimens of 6-inch (15.24 cm) square 6061 aluminum 0.125 inch (0.318 cm) thick were coated with the composition of Example 1. The ablative coating was applied to be 0.125 inch (0.318 cm) thick and then fully cured. Uncoated aluminum pieces of the same size were included in the test for comparison.

A MAPP gas flame was used to achieve a flame temperature of 2000° F. (1093° C.) which was monitored during the test with a Type K thermocouple probe having a digital readout. The thermocouple was secured 2.625 inches (6.67 cms) from the nozzle to achieve the desired temperature. The backface temperatures of the aluminum test pieces were also measured. The test was terminated either when burn-through of the aluminum occurred or at the end of 15 minutes if burn-through did not occur. In the case of the uncoated aluminum, burn-through occurred in 53 seconds and the back face thermocouple showed a temperature of 806° F. (430° C.). No burn-through occurred in those test specimens having the ablative coating adhered thereto and after 15 minutes the backspace temperature had leveled off at about 440° F. (227° C.). The coating tended to swell and form a hard charred surface.

The data obtained in these tests indicate that the ablative coating of this invention is capable of meeting Federal Aviation Regulations Part 23, "Airworthiness Standards: Normal, Utility, and Acrobatic Category Airplanes", Section 23,853, which require that "Airplane materials located on the cabin side of the firewall must be self-extinguishing or be located at such a distance from the firewall, or otherwise protected so that ignition will not occur if the firewall is subjected to a flame temperature of not less than 2,000 degrees F. for 15 minutes."

Finally, the ablative coating of this invention, was subjected to tests along with various other materials to evaluate them for their ability to protect selected airframe surfaces from heat and abrasion damage due to rocket exhaust impingement. In tests by the Naval Air Test Center involving the determination of the compatibility of the Zuni 5-inch rocket on the AH-IT helicopter, it had been found that the Zuni rocket blast overpressure was structurally acceptable. However, the rocket motor exhaust was damaging to the aircraft fairings and painted surfaces. This effect was most pronounced during ripple firing which had led to the recommendation that only single shots be permitted until a protective system could be developed. Four commercially available protective systems (a polyurethane tape, a ceramic tape, and two coating compositions) were tested along with the novel coating resulting from the application and curing of the composition of Example 1. Rocket exhaust impingement quickly resulted in the total stripping of all of the ceramic test tapes; and the polyurethane tape experienced both pitting and short term softening. After several firing flights, portions of the polyurethane tape and the two commercial coatings had become pitted, debonded and started to peel away. The coating of Example 1, although showing surface pitting, "did not tend to debond and actually appeared to stiffen the fairing structure with the heat curing effect of the rocket blast." (see "AH IT (TOW) Final Trails Phase Service Acceptance Trials (Zuni Rocket Blast-/Airframe Protective Coating Test)" Naval Air Test Center, Patuxent River, Maryland, Report No. RW-19R-80, dated July 24, 1980.) The ease of application, durability, repairability and color of the ablative coating of this invention were deemed to make it the preferred material for protecting aircraft fairings and to allow ripple-firing of rockets carried by the aircraft without damaging the aircraft finish.

The coating composition of this invention is easily applied to existing structures, it is self-curing and requires no removal of solvents, and it forms a tightly adhered flexible coating which is capable of providing thermal protection to a substrate in a very high-temperature, erosive environment.

It will thus be seen that the objects set forth above, among those made apparent from the preceding description, are efficiently attained, and, since certain changes may be made in carrying out the above method and in the composition and article set forth without departing from the scope of the invention, it is intended that all matter contained in the above description shall be interpreted as illustrative and not in a limiting sense.

We claim:
1. A coating composition suitable for application to a substrate for curing thereon to form an ablative coating, said composition consisting essentially of
(a) a reactive resin mixture of an epoxy resin and a polysulfide resin in which said epoxy resin makes up at least 25% by weight of the total resin content, said reactive mixture being self-curing to provide a tough, adherent coating which forms a char when expsoed to an ablative/erosion environment;
(b) an amine curing agent for said reactive mixture;
(c) a mixture of finel divided borate and aluminum trihydrate present in combination in an amount equivalent to between 20% and about 25% by weight of said total resin content; and (d) short refractory fibers which retain their fibrous structure during formation of said char in an amount sufficient to strengthen and toughen said char as the latter is formed.

2. A coating composition in accordance with claim 1 wherein said epoxy resin makes up from about 40% to about 60% by weight of said total resin contact.

3. A coating composition in accordance with claim 1 wherein said polysulfide resin comprises a mercaptan-terminated, long-chain aliphatic polymer containing disulfide linkages.

4. A coating composition in accordance with claim 1 wherein said epoxy resin comprises the diglycidyl ether of bisphenol A.

5. A coating composition in accordance with claim 4 wherein said epoxy resin is diluted with a minor amount of butyl glycidyl ether.

6. A coating composition in accordance with claim 1 wherein said amine curing agent is a primary or tertiary amine present in an amount equivalent to between about 5% and 15% by weight of said total resin content.

7. A coating composition in accordance with claim 1 wherein said fibers are formed of silica, carbon or a ceramic material and are present in an amount equivalent to between about 25% and about 40% by weight of said total resin content.

8. A coating composition in accordance with claim 1 including a flattening agent.

9. A coating composition in accordance with claim 8 wherein said flattening agent is an amorphous silica.

10. A coating composition in accordance with claim 1 including a low-density filler material.

11. A coating composition suitable for application to a substrate for curing thereon to form an ablative coating, said composition consisting essentially of (a) a reactive resin mixture of an epoxy resin and a polysulfide resin in which said epoxy resin makes up between about 40% and about 65% by weight of the total resin content;

(b) an amine curing agent present in an amount equivalent to between about 5% and 15% by weight of said total resin content;

(c) a mixture of zinc borate and aluminum trihydrate present in combination in an amount equivalent to between about 20% and about 40% by weight of said total resin content.

(d) short refractory fibers which retain their fibrous structure when said coating is exposed to an ablative/erosion environment present in an amount equivalent to between about 25% and about 40% by weight of said total resin content.

12. A coating composition in accordance with claim 11 including a flattening agent.

13. A coating composition in accordance with claim 11 including an amorphous silica.

14. A two component resin system consisting essentially of Components A and B which when mixed provide a coating composition suitable for application to a substrate for curing thereon to form an ablative coating, wherein Component A consists essentially of a liquid polysulfide resin and an amine curing agent, and Component B consists essentially of a liquid epoxy resin, said system also including finely divided zinc borate and aluminum trihydrate in about equal weight amounts and short refractory fibers, the major portion of which is in Component A;

the compositions of Components A and B being so adjusted that when mixed to form said coating composition said epoxy resin makes up at least 25% by weight of the total resin content; said amine curing agent is present in an amount between about 5% and 15% by weight of the total resin content, said zinc borate and aluminum trihydrate amount to between about 20% and about 25% by weight of the total resin content; and said fibers amount to between about 25% and about 40% by weight of said total resin content.

15. A resin system in accordance with claim 14 wherein said epoxy resin makes up from about 40% to about 60% by weight of said total resin content.

16. A resin system in accordance with claim 14 wherein said polysulfide resin comprises a mercaptan-terminated, longchain aliphatic polymer containing disulfide linkages.

17. A resin system in accordance with claim 14 wherein said epoxy resin comprises the diglycidyl ether of bisphenol A.

18. A resin system in accordance with claim 14 wherein said fibers are formed of silica, carbon or a ceramic material.

19. A resin system in accordance with claim 14 wherein said Component B includes amorphous silica as a flattening agent.

20. A substrate having adhered to the surface thereof an ablative coating consisting essentially of the polymeric reaction product of a polysulfide resin and an epoxy resin and having distributed therethrough (a) a mixture of finely divided zinc borate and aluminum trihydrate in substantially equal amounts; and (b) refractory fibers in an amount sufficient to strengthen and toughen said coating as the latter is charred at ablative temperatures;

said zinc borate and aluminum trihydrate being present in amounts equivalent to between 20% and about 25%, and said fibers being present in amounts equivalent to between about 25% and about 40% by weight of said reaction product, respectively.

21. A substrate in accordance with claim 20 wherein said fibers are formed of silica, carbon or a ceramic material.

22. A method of protecting a substrate in an ablative/erosion environment, said method consisting essentially of the steps of (a) applying to the a substrate a coating composition comprising (1) a reactive resin mixture of an epoxy resin and a polysulfide resin in which said epoxy resin makes up at least 25% by weight of the total resin content, (2) an amine curing agent for said reactive mixture, (3) a mixture of finely divided inorganic materials providing a source of one or more Lewis acids and being capable of forming a glassy reaction product when exposed to said ablative/erosion environment, and (4) short refractory fibers; and (b) curing said reactive resin mixture under ambient conditions.

* * * * *

UNITED STATES PATENT AND TRADEMARK OFFICE
CERTIFICATE OF CORRECTION

PATENT NO. : 4,595,714

DATED : June 17, 1986

INVENTOR(S) : Lawrence E. McAllister, et al.

It is certified that error appears in the above-identified patent and that said Letters Patent is hereby corrected as shown below:

Claim 1, column 8, line 65, please delete "expsoed" and substitute therefor -- exposed --;

Claim 1, column 9, line 1, after "between" please insert -- about --;

Claim 2, column 9, line 9, please delete "contact" and substitute therefor -- content --; and Claim 20, column 10, line 40, after "between" please insert -- about .

Signed and Sealed this

Ninth Day of September 1986

[SEAL]

Attest:

DONALD J. QUIGG

Attesting Officer

Commissioner of Patents and Trademarks